A. L. H. GRAHAM.
Gridiron.

No. 101,361.

Patented March 29, 1870.

UNITED STATES PATENT OFFICE.

ANN L. H. GRAHAM, OF CHESTER, PENNSYLVANIA.

IMPROVEMENT IN BROILER.

Specification forming part of Letters Patent No. 101,361, dated March 29, 1870.

*To all whom it may concern:*

Be it known that I, ANN L. H. GRAHAM, of Chester, in the county of Delaware and State of Pennsylvania, have invented an Improved Apparatus for Broiling Meats, &c., of which the following is a specification:

The object of my invention is to obviate the inconveniences realized in broiling meats over cooking stoves and ranges, in which the lids are removed, the fire uncovered, and draft arrested, the drippings fall into the fire, and are converted into smoke and flame, smoking and scorching the meat and filling the house with smoke and offensive smell.

Of the means which I have devised to obviate these inconveniences, the accompanying drawings are an illustration.

Figure 1:
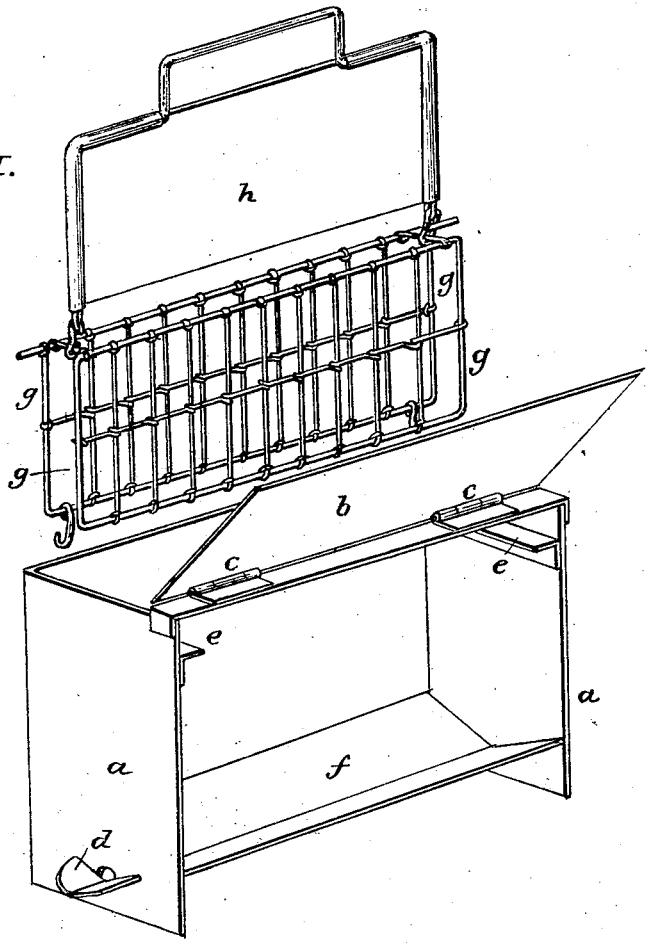
Figure 2:
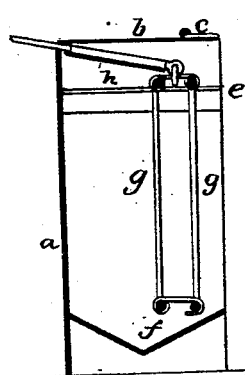
Figure 3:
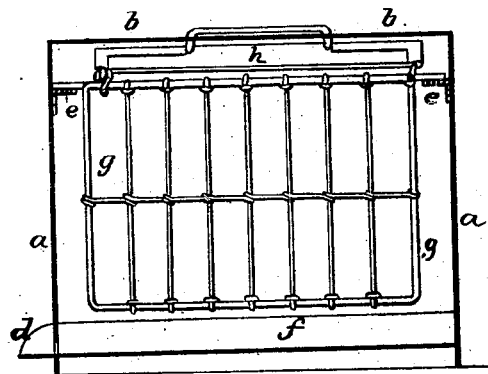

Figure 1 is a perspective view, with the broiler detached from the case. Figs. 2 and 3 are sectional views.

In Fig. 1, *a a* is the broiler-case. It is a box of tin, sheet-iron, or other suitable metal, open in front, and of such size and proportions as shall fit it to inclose the fire-front of the grate to which it is to be applied. The top of the case *b* is joined by hinges *c c* at the front, so that it may be opened from behind for introducing the meat. The bottom *f* is turned up at the edges, so as to form a pan to receive and retain the drippings, or to discharge them through a spout, *d*, into a bowl placed for the purpose. Across the ends of the case, on the inside near the top, are projecting strips of metal *e e*, to support the broiler-clamp. The broiler-clamp *g g* is composed of two griddles or parallelograms of wire net-work, united at the edges by rings or hooks, so as to hold the meat between them. At the upper corners of this clamp two gudgeons project, by means of which the clamp hangs suspended within the case, resting upon the supports *e e*. The basting-plate *h* is a sheet of metal, which is fastened, by hooks or rings, to the links which connect the upper edges of the clamp-jaws, so as to admit of its adjacent edge being adjusted to the surface of the meat next the fire. The other edge projects between the lid of the case and the upper edge of its back, by which it is held above the level of the inner edge. The plate is bound at the ends and back with wire, which is so applied as to rise above the surface of the plate equally on both sides, so as to prevent the overflow of the basting-butter in those directions. The binding-wire is formed into a ring on the outer edge of the plate, which serves as a handle to the broiler-clamp.

The two sides of the clamp may be joined by chains and hooks, or other equivalent means, by which the distance between them may be adjusted to the thickness of the meat.

When the device is to be used the meat is fastened in the clamp, and the latter is introduced under the lid and suspended, by its gudgeons, upon the supports. The lid is closed, leaving the outer edge of the basting-plate exposed. The case is then placed upon the hearth, its open front adjoining and inclosing the fire, in the immediate front of which the meat is thus presented.

As the broiling progresses the basting-butter is poured on the exposed part of the basting-plate, and flows to the meat, passing through under the edge of the lid, which is slightly raised by the thickness of the wire binding. The drippings fall into the pan or bottom of the case, flow through the spout, and are received into a bowl. When one side is done the lid is raised, the clamp is withdrawn and turned, and the process repeated.

Instead of the clamp, spits or other appliances may be used for suspending the meat in the case.

In using this device the broiler-case acts as a blower, keeping up the heat of the fire, the drippings are saved, no smoke is generated, and the fumes from the broiling meat are drawn into the fire, instead of passing into the room, while, at the same time, the top of the stove is left free for other uses.

What I claim as my invention, and desire to secure by Letters Patent, is—

The dripping-pan and basting-plate, in combination with the clamp and case, substantially as and for the purposes described.

ANN L. H. GRAHAM.

Attest:
H. HOWSON,
SAMUEL J. BAIRD.